United States Patent [19]
Haviland

[11] 3,725,266
[45] Apr. 3, 1973

[54] PROCESS FOR REMOVING METAL COMPOUND CONTAMINANTS FROM WASTE WATER

[75] Inventor: Joseph M. Haviland, Grand Rapids, Mich.

[73] Assignee: Haviland Products Company, Grand Rapids, Mich.

[22] Filed: Aug. 12, 1971

[21] Appl. No.: 171,105

[52] U.S. Cl. ...................210/45, 75/100, 204/140, 210/73, 210/78
[51] Int. Cl. .............................................C02c 5/02
[58] Field of Search..............210/50, 59, 45, 73, 78; 75/100; 204/145, 146, 140; 23/183, 200

[56] References Cited

UNITED STATES PATENTS 3,574,537  4/1971  Tsai...................................23/200 X

FOREIGN PATENTS OR APPLICATIONS 1,163,250  2/1964  Germany..............................210/78
1,953,375  4/1971  Germany..............................210/78

OTHER PUBLICATIONS

Whistance, D. J., et al.; Effluent Treatment in the Copper and Copper Alloy Industries, Prepared by British Non-Ferrous Metals Research Assoc., Jan. 1965, pp. 27-33, 75-77, 88-90, 118, 191-192.

Primary Examiner—Michael Rogers
Attorney—Price, Heneveld, Huizenga & Cooper

[57] ABSTRACT

A process for removing one or more metal compound contaminants from contaminated industrial waste water comprising precipitating the metal compound contaminants from the waste water to form an aqueous metal compound sludge, allowing the sludge to settle, concentrating the sludge by centrifugation and reclaiming the metal compound contaminants from the sludge for reuse as either the metal compounds or the free metals.

9 Claims, 3 Drawing Figures

PROCESS FOR REMOVING METAL COMPOUND CONTAMINANTS FROM WASTE WATER

BACKGROUND OF THE INVENTION

This invention relates to a process for removing metal compound contaminants from contaminated industrial waste water.

Rapidly changing industrial waste treatment regulations by local, state and federal agencies are making the metal compound waste treatment methods currently used obsolete. Partial dilution and dumping into waterways is being prohibited. Probably, the most common alternate method of trying to treat industrial metal compound treatment wastes has been the use of a batch or continuous system for attempted chemical destruction. These methods generally involve simple neutralization of acidic or alkaline solutions to cause precipitation of the metal compounds as insoluble hydroxide or carbonate sludges. Then the problem is to try to dispose of the sludge. However, the resulting metallic compound sludges are slimy and sticky and create difficult disposal problems, since they do not settle quickly and do not filter easily. After initial settling, these sludges usually contain only about two per cent solids, the remainder usually being water. Generally, these sludges are pumped to a large uncomely tank or lagoon for long periods of settling. The settled sludge is later pumped out or scooped out and hauled to a landfill dump, still containing extremely large amounts of water. The many disadvantages to this kind of operation are apparent. It is costly, space-consuming, and requires considerable maintenance labor. It is expensive to scoop up the sludge, expensive to haul it away, and the industrialist must pay to dump it in a landfill. Furthermore, the available dumping grounds for this type of material are fast disappearing by various ecology laws and ordinances, since not only are these dumps unsightly, but also seepage problems result in the pollution of waters and the killing of fish and other wildlife, and the metallic pollutants are long-lasting as they are not readily degradable. Thus, this kind of operation is becoming increasingly unsatisfactory.

Finally, these dumped sludges have no economic value nor utility.

Thus, there is a growing need for a process for removing metal compound contaminants from contaminated industrial waste water which is not beset with the disadvantages of the methods currently used, especially their injurious effect on our ecology and their lack of economic value.

SUMMARY OF THE INVENTION

According to the present invention, there is provided a process for removing metal compound contaminants from contaminated industrial waste water which substantially eliminates the problems of the conventional treatment operations and which transforms a traditionally financial loss operation into one of profit, for not only are the contaminants effectively removed to eliminate pollution problems, they are reclaimable and reuseable.

The process comprises adding one or more precipitating agents to the metal compound contaminated waste water to precipitate the metal compound contaminant therefrom to form an aqueous metal compound sludge. After settling, e.g., in settling tanks or mechanical clarifiers, the aqueous metal compound sludge is separated from the supernatant liquid and transferred to a centrifuge. The aqueous metal compound sludge is then concentrated by centrifugation. The metal compound contaminants are then reclaimed from the sludge. For example, the concentrated metal compound sludge can be dissolved and transferred to an electrolysis tank where the free metals can be recovered by electrolysis. Alternatively, the concentrated metal compound sludge can be transferred to a dissolution tank where the metal compound contaminant can be dissolved and sold, or used in solution form, or recovered from the solution in a purified state by recrystallization and sold or used in the dry form.

DESCRIPTION OF THE PREFERRED EMBODIMENTS

The process of the present invention is useful for treating a variety of metal compound contaminated industrial waste waters, such as, for example, metal compound waste waters from electroplating; electropolishing; anodizing; zinc, iron or manganese phosphating; metal strippers; paint spray booths and paint strippers; acid pickling and cleaning; tumble finishing and deburring; and wetblasting or other processes that generate wet metal compound wastes. Representative of the metals which can be removed from these contaminated waste waters by the process of the present invention include aluminum, cadmium, copper, chromium, iron, lead, manganese, mercury, nickel, silver, tin and zinc.

Figure 1:
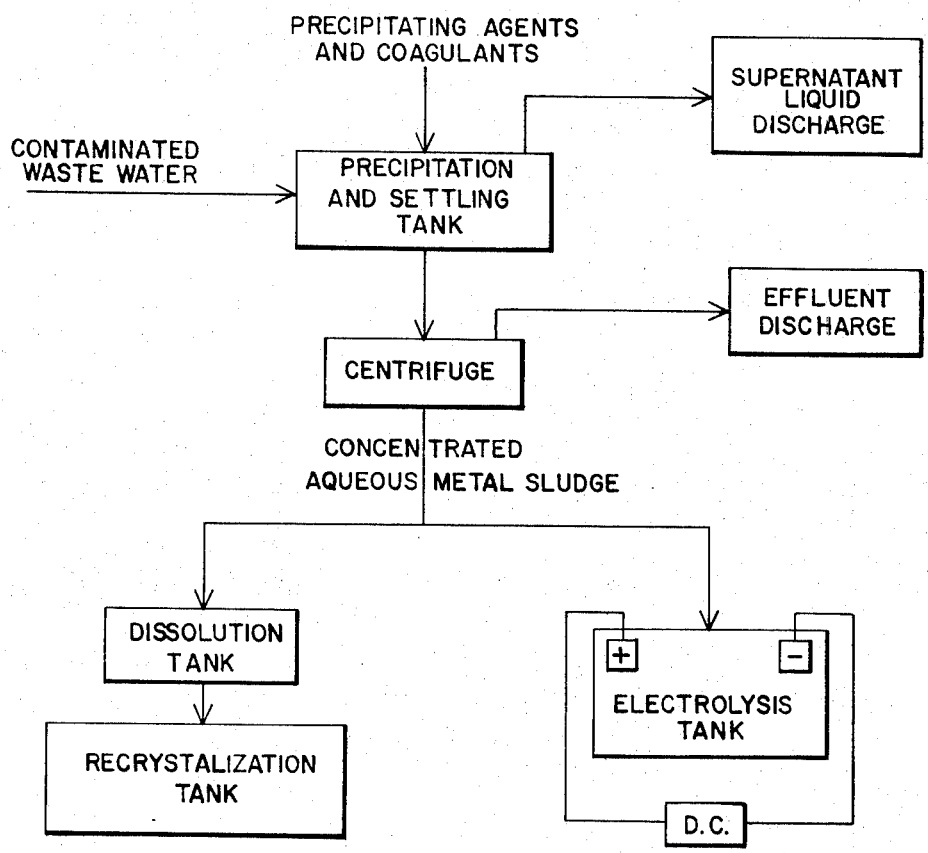
FIG. 1 is a schematic flow diagram of the process of the present invention.

Referring now to the drawings in greater detail, FIG. 1 is a schematic flow diagram of the process of the present invention. The contaminated waste water is introduced into a precipitation and settling tank to which precipitating agents are added. The particular precipitating agents used will, of course, depend upon the particular metal compound contaminants involved. The preferred precipitating agents are hydroxides and carbonates, such as, sodium hydroxide, calcium hydroxide and sodium carbonate, which produce the insoluble metal hydroxides and carbonates, respectively. In addition coagulants can be added to improve settling of the precipitate. It has been found that polyelectrolytes, such as for example, Separan, available from the Dow Chemical Co., and Primafloc, available from the Rohm and Haas Company, produce especially satisfactory coagulation.

After the precipitate has been allowed to settle, the supernatant liquid is decanted and discharged or reused. The precipitate or aqueous metal compound sludge is then transferred, e.g., by pumping or gravity to a centrifuge for concentration.

Figure 2:
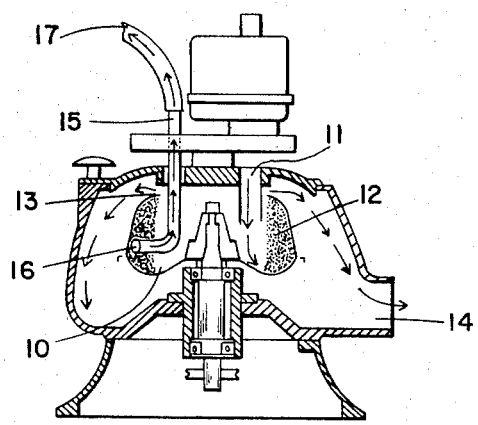
FIG. 2 is a side cross-sectional view of a centrifuge which is preferred for use in the process of the present invention.

While a variety of centrifuges can be used in the process of the present invention, a preferred centrifuge is illustrated in FIG. 2. The aqueous metal sludge is pumped or gravity fed into the rotating bowl 10 through inlet 11. While the sludge is in the bowl, it is subjected to a force of at least about 800 and preferably about from 1,400 to 2,400 gravities which causes the solids 12 to be thrown out of suspension and collect within bowl 10 where they are tightly packed. The effluent continuously flows over the rim 13 at the top of bowl 10 and is discharged through outlet 14 and is either discarded or recycled. As bowl 10 becomes filled with solids 12, solids 12 can be removed, e.g., by means of scoop 15. Scoop 15 is simply lowered and rotated to move the nozzle 16 thereof outward. As the nozzle moves outward, the revolving speed of the bowl forces the solids through the discharge tube 17. Scoop 15 is rotated through an arc to empty the bowl. It is then retracted and further centrifugation resumed. The scoop can be automatically operated and adapted with an adjustable timer which cycles the emptying of the bowl as may be required. It is preferred that the flow of the aqueous metal sludge through inlet 11 be interrupted for about from 10 to 120 seconds before the scooping operation. This permits a more complete discharge of the effluent before scooping and also increases the compaction of the solids as the bowl is continued rotating. In addition, the centrifuge can be equipped with an accelerator for greater compaction.

It has been found that the centrifugation concentrates the aqueous metal compound sludge by factors of about from 5 to 20 and produces an effluent having as much as from 75 to 95 percent of the solids removed therefrom.

The concentrated metal compound sludge can then be further processed to recover either the free metals or the metal compounds. For example, when the sludge comprises a single metal compound, the sludge can be dissolved and transferred to an electrolysis tank where the free metal can be electroplated out. Alternatively, the sludge could be transferred to a dissolution tank and the resulting metal compound solution commercially used or sold. If the metal compounds are useful in a dried state, this solution or the sludge itself could be transferred to a recrystallization tank, or dryer, where the dry or crystalline compounds could be recovered. In the event the sludge comprises a mixture of metal compounds contaminants the crystallization and plating techniques can be adapted as is well known in the art to achieve separation and recovery of the individual metal compounds.

Figure 3:
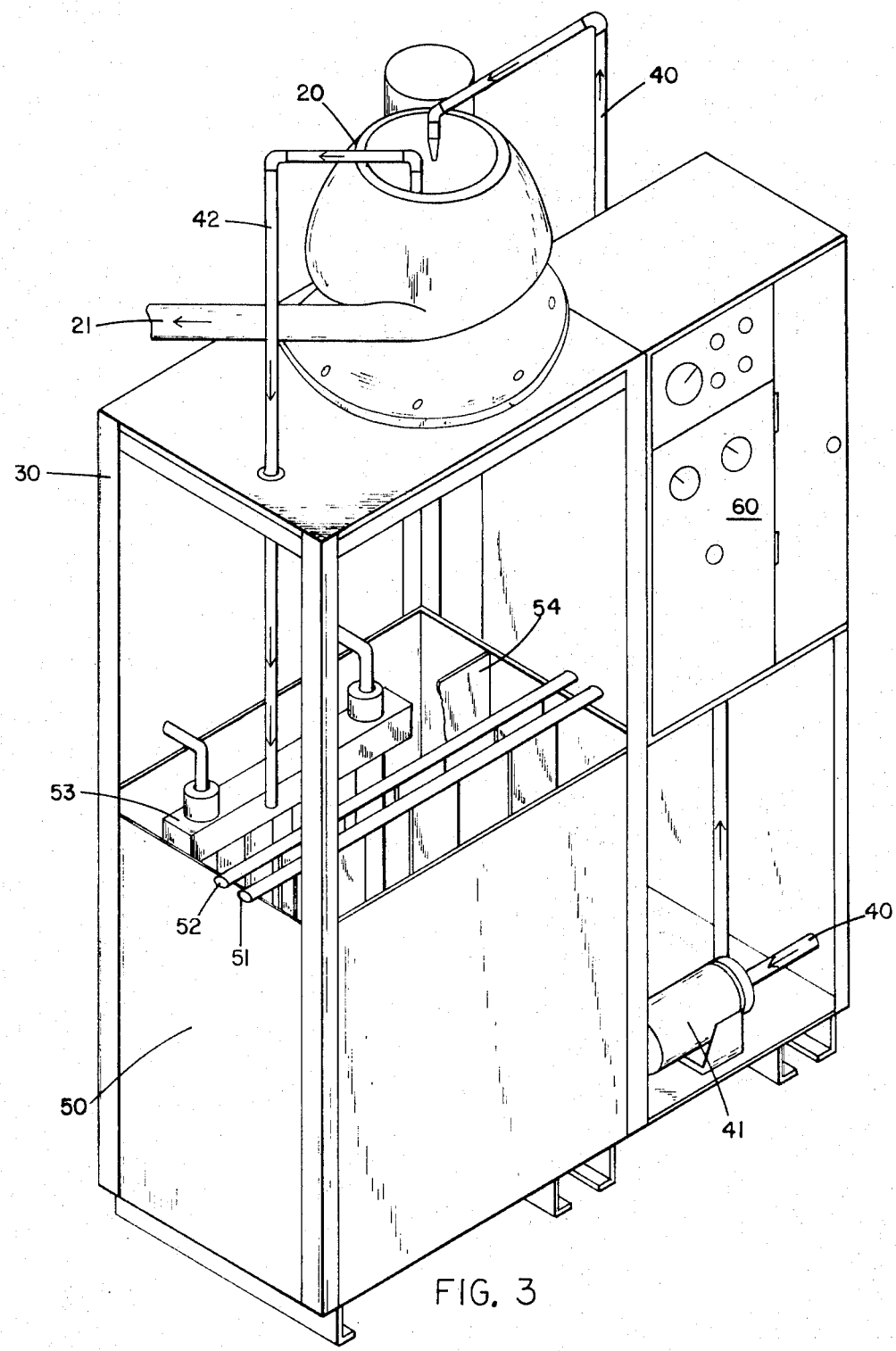
FIG. 3 is a perspective view of a centrifugation-recovery apparatus useable in the process of the present invention.

Referring now to FIG. 3, a perspective view of a centrifugation-recovery apparatus useable in the process of the present invention is shown. A centrifuge 20, such as the centrifuge illustrated in FIG. 2 and described hereinbefore, is mounted on the top of frame means 30. The aqueous metal compound sludge, which has been formed by precipitation and settling as described above, is fed to centrifuge 20 through conduits 40 by means of feed pump 41. The effluent is discharged through outlet 21 to be discarded or recycled and the solids are transferred through conduit 42 to recovery cell 50. As shown, recover cell 50 is an electroplating cell having anodes 51 and cathodes 52. Heating means 53 is disposed in cell 50 to aid in the dissolution and concentration of the solids in a suitable electrolyte. Heating means can be any conventional heater, such as, for example, a steam or an electric heater. Optionally, a center wall partition (partially shown at 54) can be disposed between heating means 53 and electrodes 51 and 52 to segregate the concentrator cell from the plating cell to permit simultaneous concentrating and plating in separate cells. Finally, control panel 60 is provided to coordinate and control the elements of the entire centrifugation-recovery apparatus. Thus, the centrifugation-recovery apparatus of FIG. 3 permits continuous and automatic centrifugation and recovery according to the process of the present invention.

While the process of the present invention has been described in terms of economic recovery and reuse of the metal compound contaminants, it will be appreciated that, even in the event it is not desired to reclaim and reuse the contaminants, the concentration of the industrial waste water according to the process of the present invention is valuable in minimizing the quantities of wastes necessitating disposal which is not only an ecological benefit but also an economic benefit due to reduced costs in handling, shipping, etc. Further, it will be realized that various changes and modifications can be made in the process of the present invention without departing from the scope thereof.

The following examples further illustrate the process of the present invention. In the examples, parts reported are by weight unless otherwise indicated.

Examples 1-10

In Examples 1-9, the aqueous metal sludges were produced by precipitating the metal hydroxides from metal compound contaminated waste water with sodium hydroxide. After settling, the sludges were then pumped to a Barret Clarifuge, manufactured by the Leon J. Barret Co., for centrifugation at from 1,400 to 2,100 gravities. In Example 10, the same procedure was followed, except the metal carbonate was precipitated with sodium carbonate.

| Example | Aqueous metal sludge | Solid conc. before centrifugation (p.p.m.) | Flow rate to centrifuge (gal./min.) | Solid conc. of sludge after centrifugation (p.p.m.) | Solid conc. of water effluent (p.p.m.) |
| --- | --- | --- | --- | --- | --- |
| 1 | Aluminum hydroxide | 8,000 | 20 | 129,000 | 1,750 |
| 2 | do | 25,000 | 15 | 155,000 | 1,500 |
| 3 | Copper hydroxide | 10,500 | 10 | 110,000 | 1,600 |
| 4 | Chromium hydroxide | 20,000 | 15 | 195,000 | 1,150 |
| 5 | do | 12,500 | 20 | 220,000 | 1,200 |
| 6 | Nickel hydroxide | 9,000 | 20 | 150,000 | 1,800 |
| 7 | Mixture of nickel, chromium, copper and zinc hydroxides | 17,000 | 15 | 185,000 | 1,200 |
| 8 | Mixture of chromium, copper and zinc hydroxides | 11,600 | 15 | 143,000 | 1,350 |
| 9 | Mixture of nickel, chromium, copper and zinc hydroxides | 60,000 | 15 | 400,000 | 3,000 |
| 10 | Copper carbonate | 6,000 | 10 | 110,000 | 1,600 |

Example 11

Concentrated aluminum hydroxide sludge produced according to the procedure of Examples 1-9 having a solids concentration of 155,000 ppm was dissolved in concentrated sulfuric acid to produce an aluminum sulfate solution useful in the paper and leather tanning industries and in phosphate removal operations in waste treatment plants.

Example 12

Concentrated chromium hydroxide sludge produced according to the procedure of Examples 1-9 having a solids concentration of 220,000 ppm was dissolved in concentrated sulfuric acid to produce a chromium sulfate solution useful in the leather tanning industry.

Example 13

Concentrated nickel hydroxide sludge produced according to the procedure of Examples 1-9 having a solids concentration of 210,000 ppm was dissolved in fluoboric acid and subjected to electrolysis in a D. C. electrolysis tank, resulting in the deposition of nickel metal on the cathode.

Example 14

Concentrated copper hydroxide sludge produced according to the procedure of Examples 1-9 having a solids concentration of 300,000 ppm was dissolved in fluoboric acid and subjected to electrolysis in a D. C. electrolysis tank, resulting in the deposition of copper metal on the cathode.

Example 15

Concentrated cadmium hydroxide sludge produced according to the procedure of Examples 1-9 having a solids concentration of 180,000 ppm was dissolved in fluoboric acid and subjected to electrolysis in a D. C. electrolysis tank, resulting in the deposition of cadmium metal on the cathode.

The embodiments of the invention in which an exclusive property or privilege is claimed are defined as follows:

1. A process for removing one or more metal compound contaminants from contaminated waste water comprising the steps of:
    adding one or more precipitating agents to said waste water to precipitate said metal compound contaminants from said waste water to form an aqueous metal compound sludge;
    allowing said aqueous metal compound sludge to settle;
    separating said aqueous metal compound sludge from the supernatant liquid;
    transferring said aqueous metal compound sludge to a centrifuge operated on a continuous basis; and
    concentrating said aqueous metal compound sludge by centrifugation at a force of at least 800 gravities.

2. A process according to claim 1 wherein said centrifugation is conducted at a force of at least 1,400 gravities.

3. A process according to claim 1 wherein a coagulating agent is added to said waste water prior to said centrifugation.

4. A process according to claim 3 wherein said coagulating agent is a polyelectrolyte.

5. A process according to claim 1 wherein said metal compound contaminants comprise one or more of the group consisting of aluminum, cadmium, copper, chromium, iron, manganese, mercury, lead, nickel, silver, tin and zinc.

6. A process according to claim 1 wherein said concentrated metal compound sludge is transferred to an electrolysis tank and the free metal is recovered by electrolysis.

7. A process according to claim 1 wherein said concentrated metal compound sludge is transferred to a dissolution tank wherein said metal compound contaminants are dissolved.

8. A process according to claim 7 wherein said dissolved metal compound contaminants are recovered by recrystallization.

9. A process according to claim 1 wherein said centrifugation is conducted on a continuous basis and wherein the transference of said aqueous metal compound sludge to said centrifuge is interrupted each time the centrifuge bowl becomes filled with solids to facilitate a greater discharge of the effluent and compaction of the solids before said bowl is emptied.

* * * * *

Disclaimer 3,725,266.—*Joseph M. Haviland*, Grand Rapids, Mich. PROCESS FOR REMOVING METAL COMPOUND CONTAMINANTS FROM WASTE WATER. Patent dated Apr. 3, 1973. Disclaimer filed June 4, 1976, by the assignee, *Haviland Products Company*.

Hereby enters this disclaimer to claims 1–9 of said patent.

[*Official Gazette August 10, 1976.*]